Aug. 11, 1931.  E. D. KOHR  1,818,896
DISCHARGE ATTACHMENT FOR FROZEN PRODUCT MACHINES
Filed Dec. 23, 1929   2 Sheets-Sheet 1
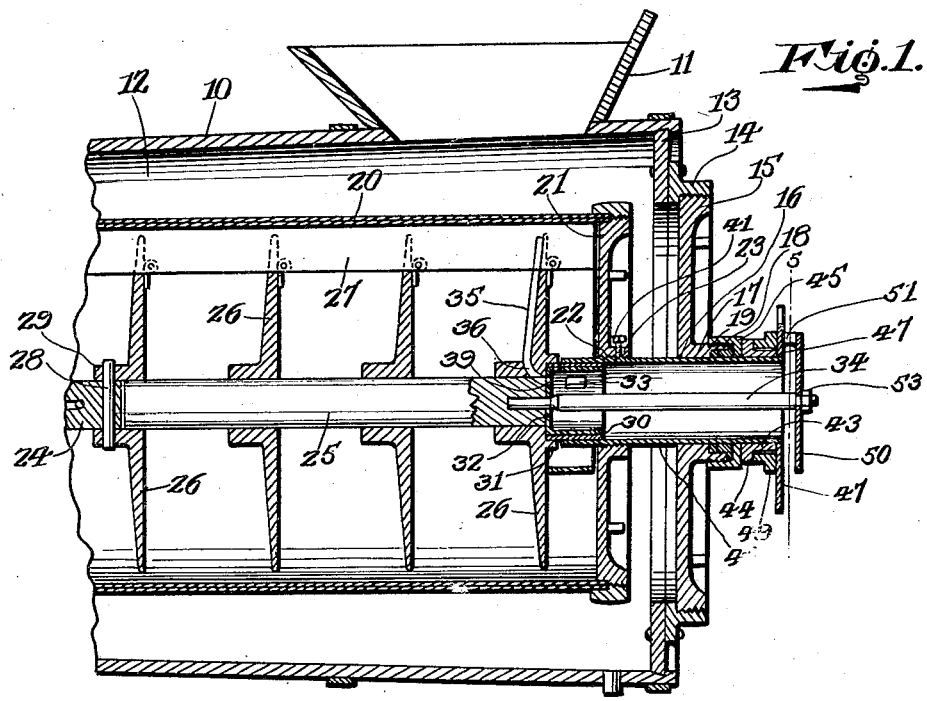
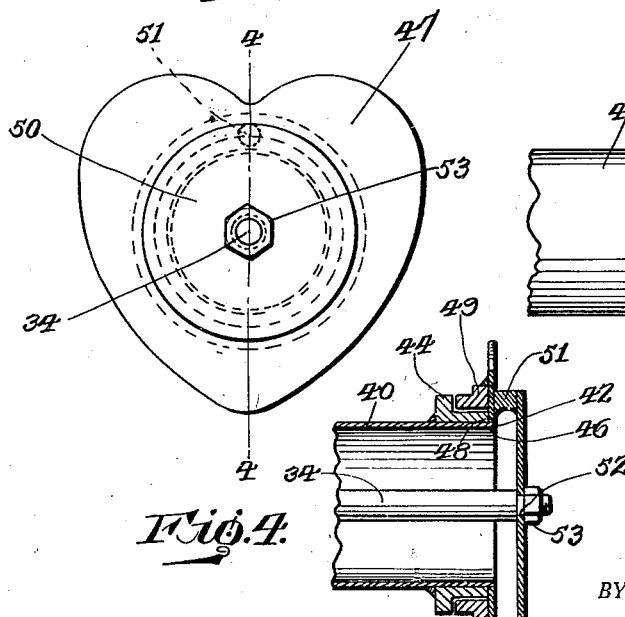
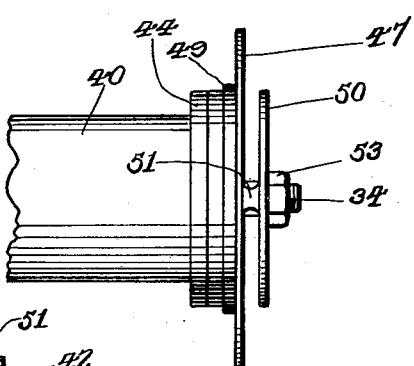
INVENTOR.
Elton D. Kohr
BY Geo. P. Kimmel
ATTORNEY.

INVENTOR.
Elton D. Kohr
BY
Geo. P. Kimmel
ATTORNEY.

Patented Aug. 11, 1931

1,818,896

UNITED STATES PATENT OFFICE

ELTON D. KOHR, OF YORK, PENNSYLVANIA

DISCHARGE ATTACHMENT FOR FROZEN PRODUCT MACHINES

Application filed December 23, 1929. Serial No. 416,182.

This invention relates to a discharge attachment for automatic ice cream freezers of that class or type which are constantly supplied with cream for fast freezing, for frozen cream being automatically discharged by the machine, is designed primarily for use in connection with a machine for producing frozen custards, but it is to be understood that a discharge attachment, in accordance with this invention may be employed in any connection for which it is found applicable, and the invention has for its object to provide, in a manner as hereinafter set forth, an attachment constructed and arranged for discharging frozen products, such as frozen custard in a sheet-like form to give an attractive effect to the product on discharge so that the product will have an appeal to the purchasing public.

Further objects of the invention are to provide, in a manner as hereinafter set forth, a discharge attachment for the purpose referred to which is simple in its construction and arrangement, strong, durable, thoroughly efficient in its use, readily installed with respect to an automatic freezer or other machine, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a fragmentary view in longitudinal section of an automatic machine for producing frozen products, such as ice cream, ices and custards, and showing the adaptation therewith of a discharge attachment in accordance with this invention and with the attachment illustrated in longitudinal section.

Figure 2 is a front elevation of the attachment.

Figure 3 is a top plan view with the spout broken away.

Figure 4 is a section on line 4—4, Figure 2.

Figure 5:
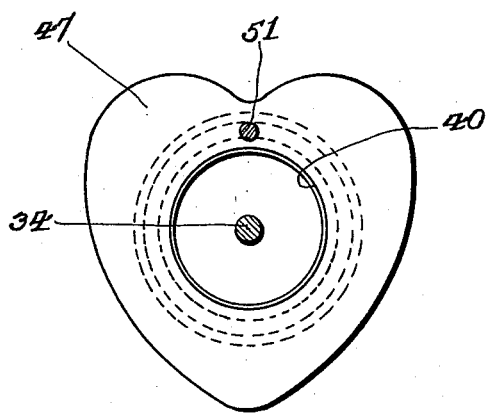
Figure 5 is a section on line 5—5, Figure 1.

A fragmentary portion of an automatic apparatus for producing frozen products, such as ice creams, frozen custards and ices, is illustrated in Figure 1 for the purpose of showing the adaptation with such type of machine or apparatus, of a discharge attachment therefor in accordance with this invention, and with the discharge attachment so formed that the product discharged from the machine will be in sheet-like form and of any suitable outline to give an attractive effect to the product on discharge, so that the product will have an appeal to the purchasing public. The apparatus or machine is of that type including a pump or compressor for feeding the cream thereto by suction, subjecting the cream during the freezing thereof to air pressure, and discharging the frozen product by air pressure.

Referring to Figure 1, 10 indicates a tub or casing provided at its top with a hopper or chute 11 through which the freezing medium is supplied to a refrigerant containing chamber 12 provided by the tub or casing. One end of the tub 10, which would be the discharge end of the machine or apparatus is provided with an annular head 13 having secured to its outer face an annular, interiorly threaded collar 14. To the threads of the collar 14 is secured a closure disc 15 provided with an axial opening 16 of the desired diameter. Integral with the outer face of disc 15 and aligning with the wall of the opening 16 is an outwardly directed collar 17 having a reduced portion 18 to form the outer part of the collar of greater inner diameter. The reduced part 18 of the collar 17 is peripherally threaded as at 19. Rotatably supported in the tub 10 is a freezer can 20 which is in the form of a cylindrical vessel provided at the end thereof shown with a removable head 21, the latter being provided with an axial opening 22 and a collar 23 on one face thereof, and which aligns with the wall of the opening 22. A shaft 24 is extended into the can 20 from that end opposite the end provided with the head 21. A shaft 25 is arranged axially of can 20 and which carries a plurality of spaced discs 26 of a diameter slightly less than the internal diameter of the can. The discs 26 serve to support a scraper 27 which is spaced from the shafts 24 and 25. The shaft 25 is connected to the stationary shaft 24 by means of a key 28 engaging in the notches 29 in the hub of one of the discs 26, thus forming a slip joint to permit the shaft 25 with its related parts to be removed endwise from the can. Connected with the shaft 25 at that end arranged adjacent the discharge end of the apparatus is a short sleeve 30 which is secured to a flange 31 on a disc 26. Positioned against that disc 26 provided with a flange 31 and surrounded by the sleeve 30 is a cup 32 having openings 33 adapted to align with openings, not shown, formed in the sleeve 30, and the latter closely engages the outer periphery of the cup 32.

The openings or slots formed in the sleeve 30 and cup 32 are provided for the discharge of the frozen cream from the interior of the can. The cup 32 is revolubly mounted within sleeve 30 to enable the slots or openings in said sleeve and cup 32 to be placed into or out of registry with the slots or openings in the sleeve 30 thereby varying the area of the escape openings. The cup 32 is carried by a stem 34 which is connected to and projects from that end of shaft 35 against which is positioned the cup 32. The stem can be adjusted for the purpose of regulating the cup 32.

A tubular air duct 35 is secured to the disc 26 having the flange 31. The duct 35 extends upwardly within the can 20, communicates at its lower end with an aperture 36 provided in the disc referred to and shaft 25. The duct or aperture 36 is obstructed by the inner wall of cup 32 when the openings of sleeve 30 and cup 32 are positioned in such relation as to permit the frozen cream to escape therethrough into a spout to be presently referred to. When the cup 32 is adjusted to place the openings of sleeve 30 and cup 32 out of registry, thus obstructing the escape of the cream entirely, the duct 36 may register with an aperture 39 in the inner wall of the cup, thereby permitting air to escape from the interior of the can 20. The means for revolving the can 20 is not shown. The foregoing elements are parts of the type of machines now in general use and are illustrated by way of example, so that one can readily understand the adaptation with such type of machine, of a discharge attachment in accordance with this invention. The structural arrangement as referred to is well known, and no claim is made thereto.

The discharge attachment in accordance with this invention, comprises an apertured spout or nozzle 40 for conducting the frozen product to the point of discharge and is positioned to extend through the opening 22 formed in the head 21. The spout 40 is threadedly connected to the wall of such opening. A binding screw 41 is provided to assist in securing the spout 40 to head 21 and said screw 41 extends through the collar 23. The spout 40 abuts the flange 20 and revolves on the sleeve 30. The spout 40 also extends through closure 15 and projects a substantial distance beyond the latter.

Fixed on the outer periphery of the spout 40 and arranged in proximity to the outer edge 42 of the spout is a collar 43 having its rear formed with an outwardly projecting, annular flange 44. Surrounding the spout 40 and interposed between the flange 44 and the collar 17 is a packing element 45 which threadedly engages with collar 17. The flange 44 abuts against the packing element 45. The spout 40 projects a substantial distance beyond the outer edge of collar 43, as indicated at 46.

The discharge attachment includes a stationary spreader member of any suitable contour and as illustrated in Figures 1 to 5 is substantially heart shaped. The spreader member is in the form of a disc indicated at 47 and provided with an axial opening to enable the mounting of member 47 on the outer periphery of the projecting portion 46 of the spout 40. The outer face of member 47 is flush with the edge of the spout 40 at the outer end of the latter. Secured to the rear face of the spreader member 47 is a flanged collar 49 which is seated upon the collar 43 outwardly with respect to the flange 44. The spreader member 47 abuts against the outer edge of the collar 43. The stem 34 provides for supporting a baffle member 50 which forms an element of the attachment and is arranged forwardly of and in spaced relation to the spreader member 47. The baffle member 50 is connected with spreader member 47 by a coupling means 51 of any suitable form and which constitutes a deflector.

The baffle member 50 is of less area than the spreader member 47 and is disposed concentrically with respect thereto. The baffle member 50 is of circular form, of greater diameter than, disposed concentrically with respect to, positioned beyond and spaced from the discharge end of spout 40. The member 50 is mounted on the reduced end 52 of the stem 34 and secured to the latter by a clamping nut 53. The stem 34 projects a substantial distance beyond the outer end of the spout 40. The spout 40 revolves with the can 20. The spreader member 47 and baffle 50 are stationary. The coupling means 51 is positioned at the top of the baffle member 50 and positioned below the top edge of the spreader member 47 a substantial distance below such edge. The coupling means 51 is arranged at the vertical median of the spreader member 47 and baffle member 50. Owing to the coupling of the spreader member 47 to the baffle member 50, and in connection with the stem 34, to which the baffle member is secured, the said members are held stationary during the revolving of the spout. The distance between the outer end of the spout and baffle member controls the thickness of the sheet form of the product on discharge.

The product is forced by air pressure through the registering openings of the sleeve 30, cup 32 and spout 40 into the latter as in the type of apparatus with which the attachment is employed. The frozen product is discharged from the spout also by air pressure.

On discharge of the frozen product through the spout 40 it will abut the baffle member 50, and be confined between the latter and member 47, the latter in connection with the baffle setting up a squeezing action, causing the product to be discharged in a sheet like form having an outline or contour corresponding to the outline of the spreader member, and as the latter is of heart shaped form, the product on discharge will appear as of such outline or contour in sheet form. The deflecting means 51 coacting with the edges of the spreader member 47 will deflect the product in a manner to assist in the shaping thereof to conform in outline to the spreader. In connection with the shaping of the discharging product, it is the deflector that gives it an outline corresponding to that of the spreader, as the product follows the lines of least resistance. The product when discharging bulges upwardly against the coupling or deflector 51. This spreads it outwards; then the drawing effect of the spreader and baffle tend to hold the product, drawing it to conform to the shape of the bottom of the spreader. Of course, the product spreads to the sides and bottom also, but resistance will be near top center due to the coupling or deflector 51 and this being closer to the center where the product comes out, causes the shape of the discharge to correspond to that of the spreader.

Figure 6:
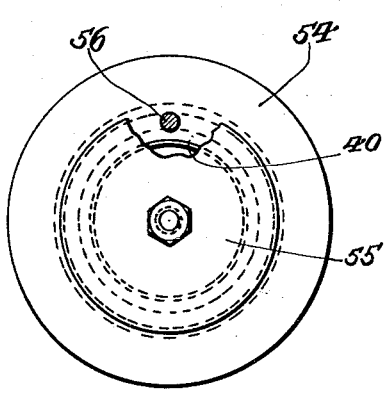
Figure 6 is a front elevation, broken away, of a modified form of attachment.

In the modified form shown in Figure 6, the spreader member is indicated at 54 and is of circular form. The baffle member 55 is also of circular form but of materially less diameter than the diameter of the spreader member 54. The coupling means between the members 54, 55 is indicated at 56, and which provides a deflecting means. The baffle and spreader members shown in Figure 6 are arranged relatively to the spout, in the same manner as the spreader and baffle members 47 and 50 shown in Figure 1.

Figure 7:
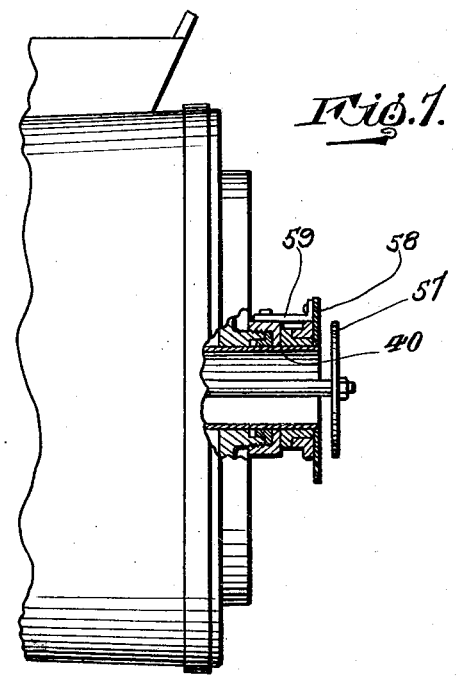
Figure 7 is a fragmentary view partly in side elevation and in longitudinal section illustrating the freezer provided with a modified form of discharge attachment in accordance with this invention.
Figure 8:
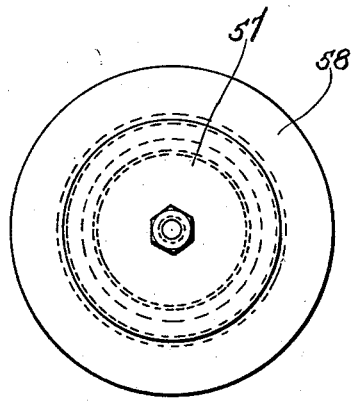
Figure 8 is a front elevation of the modified form of attachment shown in Figure 7.

The form shown in Figures 7 and 8 dispenses with the coupling means between the baffle member 57 and the spreader member 58. The spreader member 58 is maintained stationary by rearwardly extending straps 59 which are fixed to the member 58 and secured to the packing element 45. Although the spreader member 58 is shown of circular contour in Figures 7 and 8, yet it is to be understood that it can be of any suitable contour. Otherwise than that as stated, the form shown in Figures 7 and 8 would be set up in the same manner as the spreader and baffle members are shown in Figures 1 to 5, that is to say, the spreader member 58 is mounted upon the outer end of the spout 40 and is held stationary during the revolving of the spout.

The outline of the product when discharged from the spout will conform in outline to that of the spreader member, irrespective of the shape of the latter, yet no matter what outline the discharge product had, it will be discharged in sheet like form, due to the action of the baffle member in connection with the spreader member, with or without the employment of the deflecting means, but preferably the use of the deflecting means will be had especially when the spreader is of other form than that of circular. The baffle member can be of any suitable contour, other than that as shown.

Although the preferred embodiments of the invention are as illustrated and described, yet it is to be understood that changes in the details of construction can be had which fall within the scope of the invention as claimed.

What I claim is:

1. In a discharge attachment for frozen product machines of that type provided with a discharge spout, the combination of a stationary spreader adapted to be mounted in encompassing position with respect to the outlet end of the spout, and a stationary baffle arranged forwardly and in spaced relation with respect to said spreader and adapted to oppose in spaced relation such end.

2. In a discharge attachment for frozen product machines of that type provided with a discharge spout, the combination of a stationary spreader adapted to be mounted in encompassing position with respect to the outlet end of the spout, and a stationary baffle arranged forwardly and in spaced relation with respect to said spreader and adapted to oppose in spaced relation such end, said baffle and spreader being of disc-like form, the edge of the spreader projecting beyond the edge of the baffle, and the edge of the baffle projecting beyond the outer periphery of the spout.

3. In a discharge attachment for frozen product machines of that type provided with a discharge spout, the combination of a stationary spreader adapted to be mounted in encompassing position with respect to the outlet end of the spout, a stationary baffle arranged forwardly of and in spaced relation with respect to said spreader and adapted to oppose in spaced relation such end, said baffle and spreader being of disc-like form, the edge of the spreader projecting beyond the edge of the baffle, the edge of the baffle projecting beyond the outer periphery of the spout, and means interposed between the spreader and baffle and adapted to be positioned above the spout for coupling the baffle to the spreader and providing a deflector.

4. In a discharge attachment for frozen product machines of that type provided with a discharge spout, the combination of a stationary spreader adapted to be mounted in encompassing position with respect to the outlet end of the spout, a stationary baffle arranged forwardly of and in spaced relation with respect to said spreader and adapted to oppose in spaced relation such end, and means interposed between the spreader and baffle and adapted to be positioned above the spout for coupling the baffle to the spreader and providing a deflector.

5. In a discharge attachment for frozen product machines of that type provided with a discharge spout, the combination of a stationary spreader adapted to be mounted in encompassing position with respect to the outlet end of the spout, and a stationary baffle arranged forwardly of and in spaced relation with respect to said spreader and adapted to oppose in spaced relation such end, said baffle being disposed centrally to said spreader and outlet end.

6. In a discharge attachment for frozen product machines of that type provided with a discharge spout, the combination of a stationary spreader adapted to be mounted in encompassing position with respect to the outlet end of the spout, and a stationary baffle arranged forwardly and in spaced relation with respect to said spreader and adapted to oppose in spaced relation such end, said baffle and spreader being of disc like form, the edge of the spreader projecting beyond the edge of the baffle, the edge of the baffle projecting beyond the outer periphery of the spout, said baffle being disposed centrally to said spreader and outlet end.

7. In a discharge attachment for frozen product machines of that type provided with a discharge spout, the combination of a stationary spreader adapted to be mounted in encompassing position with respect to the outlet end of the spout, a stationary baffle arranged forwardly and in spaced relation with respect to said spreader and adapted to oppose in spaced relation such end, said baffle and spreader being of disc like form, the edge of the spreader projecting beyond the edge of the baffle, the edge of the baffle projecting beyond the outer periphery of the spout, and means interposed between the spreader and baffle and adapted to be positioned above the spout for coupling the baffle to the spreader and providing a deflector, said baffle being disposed centrally to said spreader and outlet end.

8. In a discharge attachment for frozen product machines of that type provided with a discharge spout, the combination of a stationary spreader adapted to be mounted in encompassing position with respect to the outlet end of the spout, a stationary baffle arranged forwardly of and in spaced relation with respect to said spreader and adapted to oppose in spaced relation such end, and means interposed between the spreader and baffle and adapted to be positioned above the spout for coupling the baffle to the spreader and providing a deflector, said baffle being disposed centrally to said spreader and outlet end.

9. In a discharge attachment for frozen product machines of that type provided with a discharge spout, the combination of a stationary spreader adapted to be mounted in encompassing position with respect to the outlet end of the spout, and a stationary baffle arranged forwardly and in spaced relation with respect to said spreader and adapted to oppose in spaced relation such end, said baffle being of a contour different from that of said spreader.

10. In a discharge attachment for frozen product machines of that type provided with a discharge spout, the combination of a stationary spreader adapted to be mounted in encompassing position with respect to the outlet end of the spout, and a stationary baffle arranged forwardly and in spaced relation with respect to said spreader and adapted to oppose in spaced relation such end, said baffle and spreader being of disc like form, the edge of the spreader projecting beyond the edge of the baffle, the edge of the baffle projecting beyond the outer periphery of the spout, said baffle being of a contour different from that of said spreader.

11. In a discharge attachment for frozen product machines of that type provided with a discharge spout, the combination of a stationary spreader adapted to be mounted in encompassing position with respect to the outlet end of the spout, and a stationary baffle arranged forwardly and in spaced relation with respect to said spreader and adapted to oppose in spaced relation such end, said baffle and spreader being of disc like form, the edge of the spreader projecting beyond the edge of the baffle, the edge of the baffle projecting beyond the outer periphery of the spout, said baffle being of a contour different from that of said spreader.

12. In a discharge attachment for frozen product machines of that type provided with a discharge spout, the combination of a stationary spreader adapted to be mounted in encompassing position with respect to the outlet end of the spout, a stationary baffle arranged forwardly of and in spaced relation with respect to said spreader and adapted to oppose in spaced relation such end, and means interposed between the spreader and baffle and adapted to be positioned above the spout for coupling the baffle to the spreader and providing a deflector, said baffle being of a contour different from that of said spreader.

13. A discharge attachment for frozen product machines comprising the combination of a spout, and a pair of spaced, opposed stationary elements coacting with said spout for discharging the product in sheet like form and conforming in contour to that of the inner one of said elements, one of said elements encompassing the outlet end of the spout and the other arranged forwardly of, spaced from and opposing said outlet end.

14. A discharge attachment for frozen product machines comprising the combination of a spout, and a pair of spaced, opposed stationary elements coacting with said spout for discharging the product in sheet like form and conforming in contour to that of the inner one of said elements, one of said elements encompassing the outlet end of the spout and the other arranged forwardly of, spaced from and opposing said outlet end, that element encompassing said outlet end projecting beyond the other of said elements.

15. A discharge attachment for frozen product machines comprising a spout, and coacting discs, one arranged in advance of and spaced from the other for forming the discharge from the spout in sheet like form and of a contour conforming to that of the rear one of said elements, the rear one of said elements encompassing and the forward element opposing the outlet end of the spout.

16. A discharge attachment for frozen product machines comprising a stationary spreader of disc like form, a stationary baffle of disc like form opposing and spaced forwardly of the spreader and coacting with the latter to provide for the product or discharge to conform in contour to that of the spreader, a revoluble spout positioned rearwardly of and spaced from said baffle, said baffle of a diameter greater than the diameter of and disposed concentrically to said spout, said spreader encompassing the outlet end of the spout and having its edge projecting beyond the edge of the baffle.

17. A discharge attachment for frozen product machines comprising a stationary spreader of disc like form, a stationary baffle of disc like form opposing and spaced forwardly of the spreader and coacting with the latter to provide for the product or discharge to conform in contour to that of the spreader, a revoluble spout positioned rearwardly of and spaced from said baffle, said baffle of a diameter greater than the diameter of and disposed concentrically to said spout, said spreader encompassing the outlet end of the spout and having its edge projecting beyond the edge of the baffle, and disc coupling and product deflecting means positioned between the top of the baffle and upper part of the spreader.

18. A discharge attachment for frozen product machines of that type including a discharge spout, the combination of a flat heart-shaped spreader encompassing the spout at the outlet end of the latter, a circular baffle positioned outwardly of said end and spaced from said spreader, said baffle of greater diameter than said end and disposed concentrically relative to the spreader, said spreader of greater height and width than the diameter of the baffle, and a deflector interposed between the spreader and baffle, said deflector secured to the inner face of the baffle at the top of the vertical median of the latter and to the outer face of the spreader below the top of the vertical median of the latter.

19. A discharge attachment for frozen product machines of that type including a discharge spout, the combination of a flat spreader encompassing the spout at the outlet end of the latter, a circular flat baffle outwardly of and spaced from the spreader, said baffle of greater diameter than said end, disposed concentrically relative to and of a different contour than that of the spreader, said spreader of greater height and width than that of the baffle, and a deflector interposed between the baffle and spreader, said deflector secured to the inner face of the baffle at the top of the vertical median of the latter and to the outer face of the spreader below the top of the vertical median of the latter.

In testimony whereof, I affix my signature hereto.

ELTON D. KOHR.